United States Patent
Sato et al.

(10) Patent No.: US 6,379,830 B1
(45) Date of Patent: Apr. 30, 2002

(54) SOLID ELECTROLYTE FUEL CELL HAVING ANODE COMPRISING METAL OXIDE PARTICLES IN A POROUS PLATINUM LAYER

(75) Inventors: Kazunori Sato; Katsuyuki Sakamaki; Yasunobu Inoue, all of Nagaoka; Shigeaki Suganuma, Nagano, all of (JP)

(73) Assignee: Shinko Electric Industries Co., LTD, Nagano (JP)

( * ) Notice: Subject to any disclaimer, the term of this patent is extended or adjusted under 35 U.S.C. 154(b) by 0 days.

(21) Appl. No.: 09/584,965

(22) Filed: Jun. 2, 2000

(30) Foreign Application Priority Data

Jun. 3, 1999 (JP) .......................................... 11-156618

(51) Int. Cl.[7] ................................................ H01M 8/10
(52) U.S. Cl. .............................. 429/30; 429/44; 429/45; 429/12
(58) Field of Search ............................. 429/30, 44, 45, 429/12

(56) References Cited

FOREIGN PATENT DOCUMENTS

| WO | WO87/02715 | 5/1987 | |
|---|---|---|---|
| WO | WO 92/15122 | * 9/1992 | ............ H01M/8/12 |

OTHER PUBLICATIONS

Sato, et al., "Electrode Activity of PdCoO2 for the anodic oxidation of methane in a solid–oxide fuel cell," 1998, Progress in Batteries & Battery Materials, vol. 17, pp. 137–143.*

Sato, K. et al., "Electrode Activity of PdCoO2 for the Anodic Oxidation of Methane in a Solid–Oxide Fuel Cell", Progress in Batteries & Battery Materials, vo. 17, 1998, pp. 137–143.

* cited by examiner

Primary Examiner—Gabrielle Brouillette
Assistant Examiner—Angela J. Martin
(74) Attorney, Agent, or Firm—Staas & Halsey LLP (57) ABSTRACT

In a solid electrolyte fuel cell which includes a solid electrolyte device having electrodes formed on both surfaces of an oxygen ion-conductive solid electrolyte substrate and wherein oxygen is supplied to the electrode on the cathode side and methane gas, as fuel, is supplied to the electrode on the anode side of the solid electrolyte device, metal oxide particles consisting of $CoNiO_2$ are blended, as an oxidation catalyst for the methane gas, with a porous platinum layer forming substantially the electrode on the anode side of the solid electrolyte device.

4 Claims, 8 Drawing Sheets

SOLID ELECTROLYTE FUEL CELL HAVING ANODE COMPRISING METAL OXIDE PARTICLES IN A POROUS PLATINUM LAYER

BACKGROUND OF THE INVENTION

1. Field of the Invention

This invention relates to a solid electrolyte fuel cell. More particularly, the present invention relates to a solid electrolyte fuel cell equipped with a solid electrolyte device which has electrodes formed on both surfaces of an oxygen ion-conductive solid electrolyte substrate and in which an oxygen-containing gas is supplied to the electrode on the cathode side of the solid electrolyte device while methane gas, as fuel, is supplied to the electrode on the anode side.

2. Description of the Related Art

Figure 10:
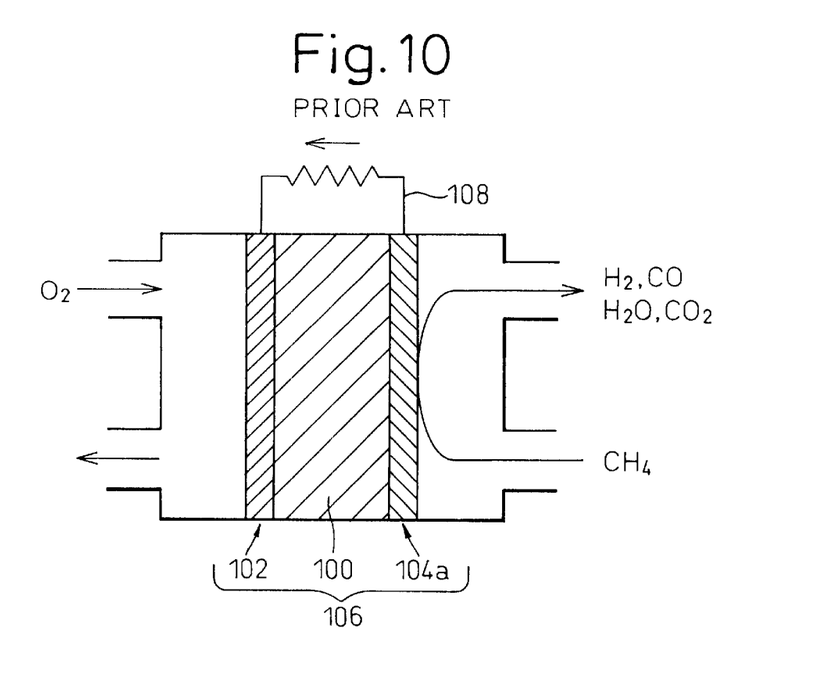
FIG. 10 is a schematic view useful for explaining the outline of a conventional solid electrolyte fuel cell.

Solid electrolyte fuel cells are expected to provide a higher power generation efficiency than the power generation efficiency of thermal power generation or the like. Therefore, numerous studies regarding fuel cells have been done. As shown in FIG. 10, a solid electrolyte fuel cell uses a burned body of stabilized zirconia containing yttria ($Y_2O_3$) (hereinafter called merely the "YSZ burned body") as an oxygen ion-conductive solid electrolyte substrate 100. (This stabilized zirconia will be hereinafter called "YSZ" in some cases.) The solid electrolyte fuel cell further includes a solid electrolyte device 106 having electrodes 102 and 104a formed on both surfaces of the solid electrolyte substrate 100.

Of the electrodes 102 and 104a of this solid electrolyte device 106, the electrode 102 is made of lanthanum strontium manganese oxide [ $(La_{0.85}Sr_{0.15})_{0.90}MnO_3$], and is used as the cathode. Oxygen or an oxygen-containing gas is supplied to this electrode 102. The other electrode 104a comprises a porous platinum layer, and is used as the anode. Methane gas, as fuel, is supplied to this electrode 104a.

Oxygen ($O_2$) supplied to the electrode 102 of the solid electrolyte device 106 shown in FIG. 10 is ionized to oxygen ions ($O^{2-}$) at the boundary between the electrode 102 and the solid electrolyte substrate 100. The oxygen ions ($O^{2-}$) are transferred by the solid electrolyte substrate 100 to the electrode 104a. The oxygen ions ($O^{2-}$) so transferred to the electrode 104a react with methane ($CH_4$) gas supplied to the electrode 104a, forming water ($H_2O$), carbon dioxide ($CO_2$), hydrogen ($H_2$) and carbon monoxide (CO). Since the oxygen ions emit electrons during this reaction, a potential difference develops between the electrode 102 and the electrode 104a. When the electrodes 102 and 104a are electrically connected to an external circuit 108, the electrons of the electrode 104a flow through the external circuit 108 to the electrode 102 (indicated by an arrow). Electric power can thus be obtained from the solid electrolyte fuel cell.

Incidentally, the operating temperature of the solid electrolyte fuel cell shown in FIG. 10 is approximately 1,000° C.

The solid electrolyte device 106 shown in FIG. 10 has durability against the high operating temperature, but has low power generation performance such as terminal current density and discharge current density. Therefore, further improvements of the cell performance are required.

Figure 11:
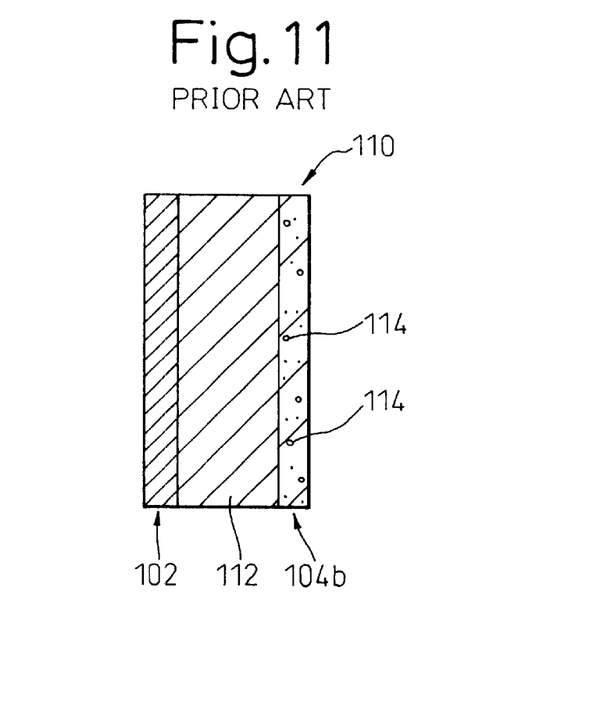
FIG. 11 is a sectional view useful for explaining the structure of a solid electrolyte device used in the conventional electrolyte fuel cell.

A solid electrolyte device 110 shown in FIG. 11 has been used. The solid electrolyte device 110 substantially comprises a solid electrolyte substrate 112 made of YSZ, and the electrode 104b as the anode is formed at one of the ends of this solid electrolyte substrate 112. The electrode 104b is made of the mixture of YSZ, that forms the solid electrolyte substrate 112, and cermet particles 114, 144 comprising of nickel (Ni) and nickel oxide (NiO).

Incidentally, the electrode 102 as the cathode, that is formed at the other end of the solid electrolyte substrate 112, is made of lanthanum strontium manganese oxide in the same way as the electrode 102 of the solid electrolyte device 106 shown in FIG. 10.

The solid electrolyte fuel cell using the solid electrolyte device 110 (hereinafter called the "Ni-YSZ cermet solid electrode device 110" in some cases) shown in FIG. 11 has an improved power generation performance, such as discharge current density and terminal current density, in comparison with the solid electrolyte fuel cell using the solid electrolyte device 106 shown in FIG. 10.

However, the operating temperature of the solid electrolyte fuel cell using the solid electrolyte device 110 shown in FIG. 11, at which power can be obtained in a stable way, is at least about 920° C. Power cannot be obtained stably at a temperature lower than 920° C. The phenomenon of a gradual drop of activity of the solid electrolyte substrate 110 occurs at an operating temperature higher than 920° C. Therefore, an improvement in the heat-resistant property of the solid electrolyte substrate 110 is required.

When a dry methane gas, after the removal of moisture, is supplied as fuel to the electrode 104b as the anode, the reactivity between the methane gas and the oxygen ions drops with the result that the solid electrolyte fuel cell fails to exhibit its full performance. For this reason, moisture-containing wet methane gas is supplied to the electrode 104b at present so as to secure reactivity between the methane gas and the oxygen ions.

The reaction between the methane gas and the high-temperature vapor is the endothermic reaction. Therefore, the temperature on the side of the electrode 140b drops, and carbon that is formed with the drop of the reaction temperature adheres to the electrode 104b and promotes a drop in activity of the solid electrolyte device 110. In other words, stable power generation is difficult.

It is therefore an object of the present invention to provide a solid electrolyte fuel cell that has an improved power generation performance, such as discharge current density and terminal current density, and has the maximum heat-resistance of the solid electrolyte device.

SUMMARY OF THE INVENTION

Figure 12:
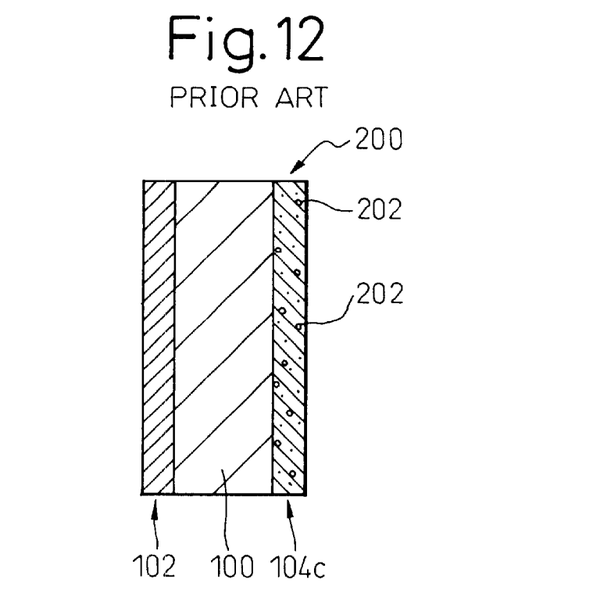
FIG. 12 is a sectional view useful for explaining an improvement example of the solid electrolyte device used in the conventional solid electrolyte fuel cell.

As a result of studies to solve the problem described above, the inventors of this invention have found that a solid electrolyte fuel cell using the solid electrolyte device 200 shown in FIG. 12 has an improved power generation performance, such as discharge current density and terminal current density, in comparison with the solid electrolyte fuel cell shown in FIG. 10, and can stably generate power even at an operating temperature of less than 920° C. Some of the present inventors proposed a solid electrolyte fuel cell using the solid electrolyte device 200 shown in FIG. 12 in "Progress in Battery & Battery Materials", Vol. 17, April (1998), p. 137–143.

In the solid electrolyte device 200 shown in FIG. 12, electrodes 102 and 104c are formed on both surfaces of a solid electrolyte substrate 100 comprising a YSZ burned body. The electrode 102 used as the cathode is formed of lanthanum strontium manganese oxide [$(La_{0.85}Sr_{0.15})_{0.90}MnO_3$]. Metal oxide particles 202, 202 made of $PdCoO_2$ are blended in a porous platinum layer that forms the electrode 104c used as the anode.

However, power generation performance, such as discharge current density and terminal current density, of the solid electrolyte device 200 shown in FIG. 12, is not yet sufficient.

Therefore, the inventors of the present invention have further studied solid electrolyte fuel cells to improve the power generation performance, such as discharge current density and terminal current density, and the thermal and chemical stability of the solid electrolyte device. As a result, the present inventors have found that the power generation performance of the electrolyte fuel cell, such as discharge current density and terminal current density, and the heat-resistant property of the solid electrolyte device, can be improved remarkably when the solid electrolyte fuel cell has the solid electrolyte fuel device formed by blending metal particles of $CoNiO_2$ in the porous platinum layer forming the electrode on the anode side, or the solid electrolyte fuel device has an oxide layer, in which metal oxide particles of $PdCoO_2$ are sintered, on the surface of the porous platinum layer forming the electrode on the anode side. The inventors have thus completed the present invention.

In a solid electrolyte fuel cell of the type which is equipped with a solid electrolyte device having electrodes formed on both surfaces of an oxygen ion-conductive solid electrolyte substrate, and in which oxygen or an oxygen-containing gas is supplied to the electrode on the cathode side of the solid electrolyte device while methane gas, as fuel, is supplied to the electrode on the anode side, the present invention provides a solid electrolyte fuel cell having the construction wherein metal oxide particles consisting of $CoNiO_2$ or CoO are blended as an oxidation catalyst for methane gas in the porous platinum layer that forms substantially the electrode on the anode side of the solid electrolyte device.

In a solid electrolyte fuel cell of the type which is equipped with a solid electrolyte device having electrodes formed on both surfaces of an oxygen-containing solid electrolyte substrate, and in which oxygen or an oxygen-containing gas is supplied to the electrode on the cathode side of the solid electrolyte device while methane gas, as fuel, is supplied to the electrode on the anode side, the present invention provides a solid electrolyte fuel cell having the construction wherein an oxide layer in which metal oxide particles consisting of $PdCoO_2$ are sintered as an oxidation catalyst for methane gas is formed on the surface of the porous platinum layer that forms the electrode on the anode side of the solid electrolyte device.

In these inventions, it is suitable to form the solid electrolyte substrate of a stabilized zirconia burned body containing yttria, and to form the electrode on the cathode side of lanthanum strontium manganese oxide $[(La_{0.85}Sr_{0.15})_{0.90}MnO_3]$.

In the solid electrolyte fuel cell according to the present invention, the metal oxide particles of $CoNiO_2$ or CoO, as an oxidation catalyst for methane gas, blended in the porous platinum layer forming the electrode on the anode side of the solid electrolyte device, or the metal oxide particles of $PdCoO_2$ as an oxidation catalyst for methane gas, sintered into the oxide layer on the surface of the porous platinum layer, can promote the oxidation reaction of methane. Therefore, the solid electrolyte fuel cell according to the present invention can generate power more stably and over a broader range of the operating temperature, at which power can be generated stably, than the solid electrolyte fuel cell equipped with the Ni-YSZ cermet solid electrolyte device 110 shown in FIG. 11.

A dry methane gas, that need not contain moisture, can be used as the methane gas supplied as the fuel.

Among the solid electrolyte fuel cells according to the present invention, the solid electrolyte fuel cell equipped with the solid electrolyte device that contains the metal oxide particles of $CoNiO_2$ or CoO blended in the porous platinum layer forming the electrode on the anode side is superior in power generation performance, such as discharge current density and terminal current density, and in thermal and chemical stability, to the solid electrolyte fuel cell equipped with the solid electrolyte device that contains the metal oxide particles of $PdCoO_2$ sintered into the oxide layer on the surface of the porous platinum layer forming the electrode on the anode side.

DESCRIPTION OF THE PREFERRED EMBODIMENTS

Figure 1:
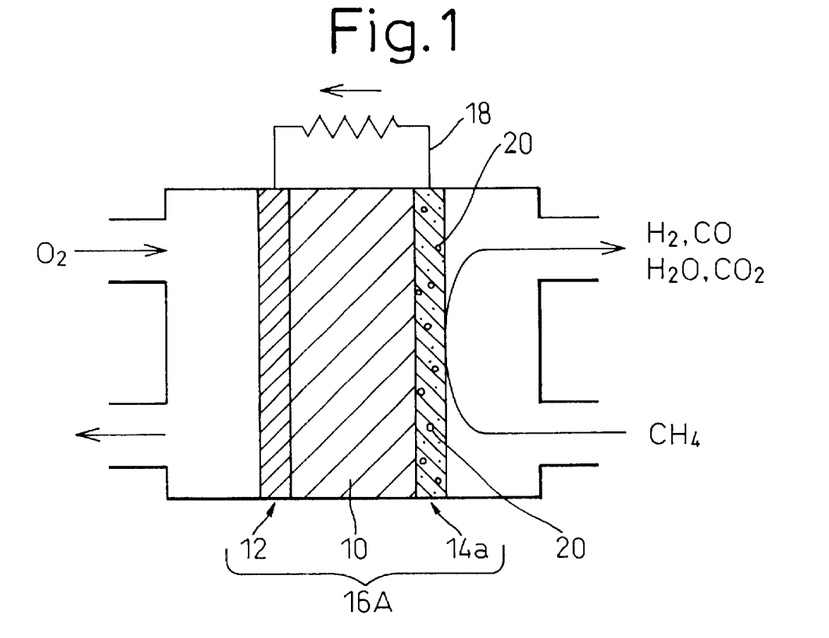
FIG. 1 is a schematic view useful for explaining a solid electrolyte fuel cell according to an embodiment of the present invention.

FIG. 1 is a schematic view useful for explaining a solid electrolyte fuel cell according to one embodiment of the present invention. The solid electrolyte fuel cell shown in FIG. 1 uses a YSZ burned body made of stabilized zirconia (YSZ) containing 8 mol % of yttria ($Y_2O_3$) as an oxygen ion-conductive solid electrolyte substrate 10. Electrodes 12 and 14a are formed on both surfaces of this solid electrolyte substrate 10 to give a solid electrolyte device 16A.

Of the electrodes 12 and 14a, the electrode 12 is made of lanthanum strontium manganese oxide $[(La)La_{0.85}$ $Sr_{0.15})_{0.90}MnO_3]$ and is used as the cathode. Oxygen is supplied to this electrode (12). The other electrode 14a is used as the anode and is substantially made of a porous platinum layer. Methane gas, as fuel, is supplied to this electrode (14a).

Oxygen ($O_2$) supplied to the electrode 12 of the solid electrolyte device 16A shown in FIG. 1 is ionized to oxygen ions ($O^{2-}$) at the boundary between the electrode 12 and the solid electrolyte substrate 10. The oxygen ions ($O^{2-}$) are transferred to the electrode 14a by the solid electrolyte substrate 10. The oxygen ions ($O^{2-}$) so transferred to the electrode 14a react with the methane ($CH_4$) gas supplied to the electrode 14a and generate water ($H_2O$), carbon dioxide ($CO_2$), hydrogen ($H_2$) and carbon monoxide (CO). Since the oxygen ions emit electrons during this reaction, a potential difference develops between the electrode 12 and the electrode 14a. When the electrodes 12 and 14a are electrically connected by an external circuit 18, the electrons of the electrode 14a flow through the external circuit 18 to the electrode 12 (indicated by an arrow), and electric power can be obtained from the solid electrolyte fuel cell.

The electrode 14a of the solid electrolyte device 16A shown in FIG. 1 is mainly made of the porous platinum layer. Metal oxide particles 20, 20 of $CoNiO_2$ or CoO as the oxidation catalyst for methane gas are blended in this porous platinum layer. The metal oxide particles 20, 20 can promote the oxidation of methane with the oxygen ions ($O^{2-}$) transferred by the solid electrolyte substrate 10, and can improve the power generation performance of the solid electrolyte fuel cell such as discharge current density and terminal current density.

Such an electrode 14a can be produced by mixing a predetermined amount of the metal oxide particles of $CoNiO_2$ or CoO, that are pulverized in advance, with a platinum paste, applying the resulting mixed paste to one of the surfaces of the YSZ burned body, and sintering the burned body at 1,300° C. for about 1 hour in the open air.

Figure 2:
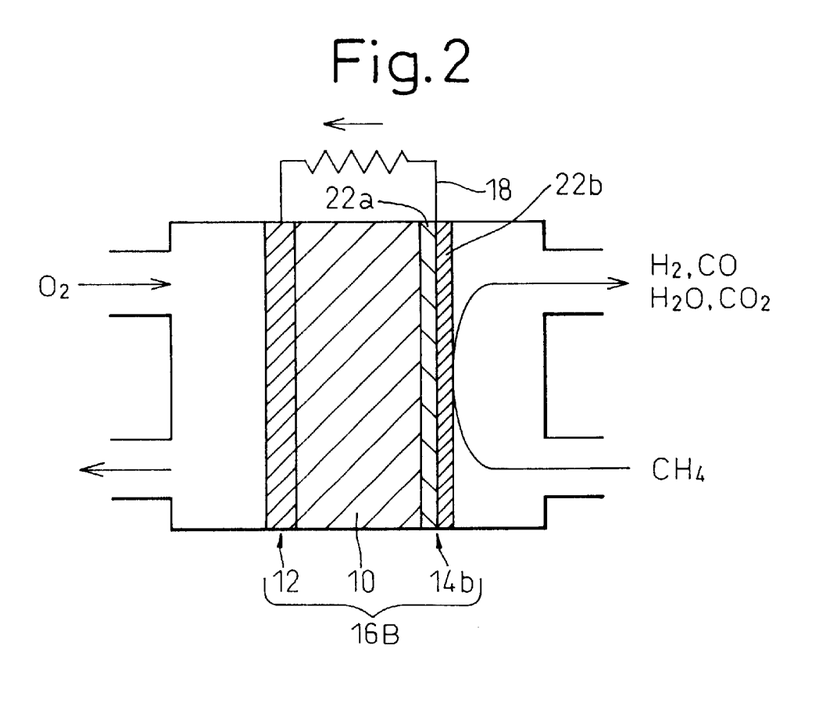
FIG. 2 is a schematic view useful for explaining the solid electrolyte fuel cell according to another embodiment of the present invention.

FIG. 2 is a schematic view showing another example of the solid electrolyte fuel cell according to the present invention. The solid electrolyte fuel cell shown in FIG. 2 uses the YSZ burned body made of stabilized zirconia (YSZ) containing 8 mol % of yttria ($Y_2O_3$) as the oxygen ion-conductive solid electrolyte substrate 10 in the same way as the solid electrolyte fuel cell shown in FIG. 1. The electrodes 12 and 14b are formed on both surfaces of this solid electrolyte substrate 10 to give the solid electrolyte device 16B.

Of the electrodes 12 and 14b of this solid electrolyte device 16B, the electrode 12 is made of lanthanum strontium manganese oxide [$(La_{0.85}Sr_{0.15})_{0.90}MnO_3$] in the same way as the solid electrolyte fuel cell shown in FIG. 1, and is used as the cathode. Oxygen is supplied to this electrode 12. The other electrode 14b is used as the anode. Methane gas, as fuel, is supplied to this electrode 14b.

The electrode 14b of the solid electrolyte fuel cell shown in FIG. 2 comprises a porous platinum layer 22a formed on one of the end faces of the solid electrolyte substrate 10 and an oxide layer 22b, in which metal oxide particles of $PdCoO_2$ are sintered, formed on the surface of the porous platinum layer 22a, as a catalyst for methane gas. This layer 22b can promote the oxidation reaction between the oxygen ions ($O^{2-}$), that are transferred by the solid electrolyte substrate 10 to the electrode 14b, and methane. The layer 22b can eventually improve the power generation performance of the solid electrolyte fuel cell, such as discharge current density and terminal current density.

The electrode 14b is formed in the following way. A platinum paste is applied, to a predetermined thickness, to one of the surfaces of the YSZ burned body, and is sintered at 1,300° C. for about 1 hour to form the porous platinum layer 22a. Next, a predetermined amount of metal oxide particles 20 of $PdCoO_2$, that are pulverized in advance, are mixed with an organic binder to form a mixed paste. The mixed paste is then applied to the porous platinum layer 22a and is burned at 850° C. for about 3 hours in the open air.

Figure 3:
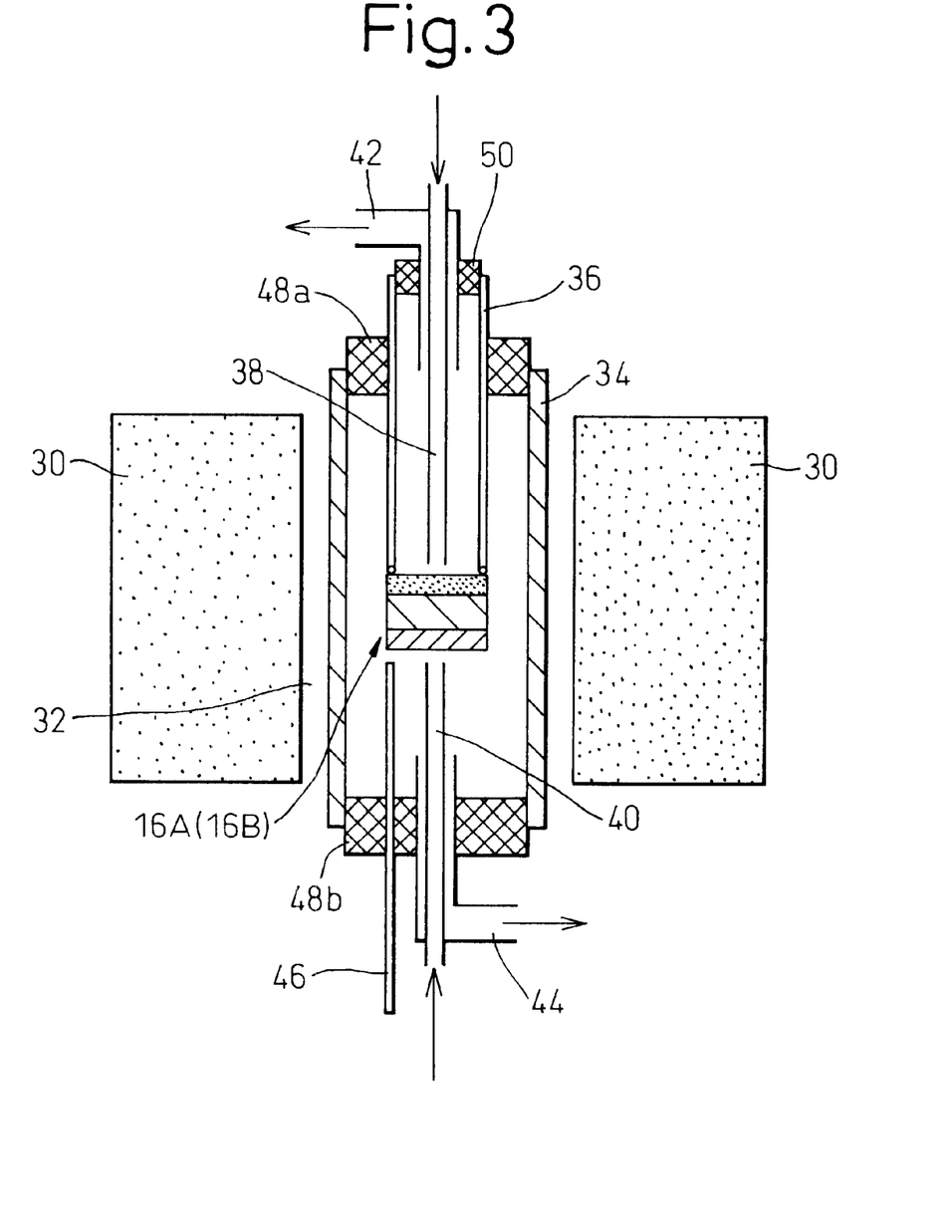
FIG. 3 is a schematic view useful for explaining a measuring apparatus for measuring power generation performance of a solid electrolyte device.

The power generation performances of the solid electrolyte device 16A shown in FIG. 1 and the solid electrolyte device 16B shown in FIG. 2 were measured by the measuring apparatus shown in FIG. 3. The measuring apparatus shown in FIG. 3 has a first cylinder 34 made of ceramic that is inserted into a space 32 kept at a desired temperature by a furnace 30, and a second cylinder 36 made of ceramic that is inserted into one of the open ends of the first cylinder 34. The solid electrolyte device 16 is disposed at the insertion end of the second cylinder 36 so that the electrode 14 of this solid electrolyte device 16 closes one of the open ends of the second cylinder 36. A methane gas feed pipe 38 is open near the electrode 14 of this solid electrolyte device 16. This methane gas feed pipe 38 supplies a dry methane gas, substantially not containing moisture, at a predetermined flow rate. An exhaust piping 42 for exhausting the combustion products of the methane gas is disposed near the other open end of the second cylinder 36.

An oxygen feed pipe 40 for supplying oxygen at a predetermined flow rate is inserted into the other open end of the first cylinder 34 in the proximity of the electrode 12 of the solid electrolyte device 16A or 16B. Exhaust piping 44 for exhausting the residue of oxygen supplied, etc, is disposed at the other open end of the first cylinder 34. Furthermore, a thermocouple 46 is inserted from the other open end of the first cylinder 34 so that the ambient temperature near the solid electrolyte device 16 can be measured.

Incidentally, both open ends of the first cylinder 34 and the other open end of the second cylinder 36 are closed by plugs 48a, 48b and 50 made of a silicone rubber, respectively.

Figure 4:
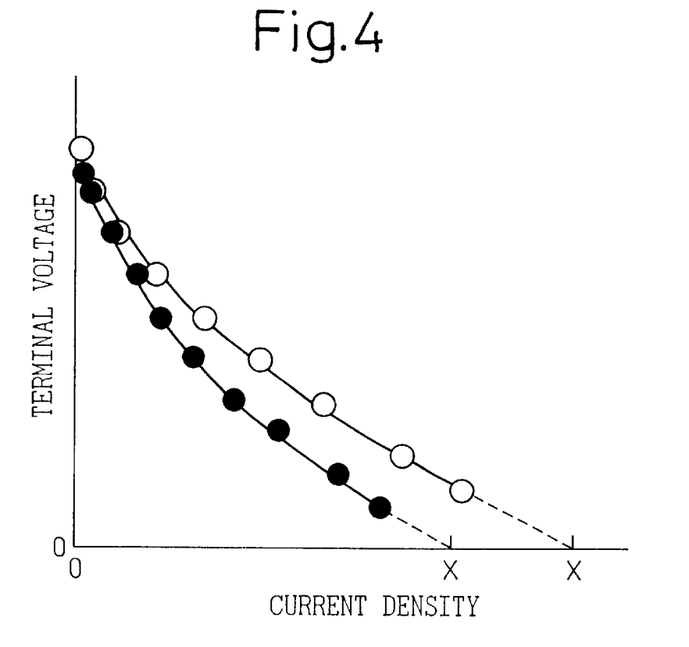
FIG. 4 is a graph showing the discharge characteristics of the solid electrolyte device measured by the measuring apparatus shown in FIG. 3.

While the ambient temperature near the solid electrolyte device fitted to the measuring apparatus shown in FIG. 3 is being measured by the thermocouple 46, the furnace 30 is controlled to attain a desired temperature, giving the discharge characteristics shown in FIG. 4. The discharge characteristic curve of FIG. 4 represents the measurement result of the terminal voltage while the current quantity of the terminal current is changed, of the terminal voltage and the terminal current picked up from both electrodes of the solid electrolyte device. The abscissa of the graph in FIG. 4 represents the current density (terminal current quantity per unit area of the electrode), and the ordinate represents the terminal voltage. It can be seen from the discharge characteristic curve shown in FIG. 4 that the greater the terminal current quantity from the solid electrolyte device (the higher the current density), the lower the terminal voltage. The current density when the terminal voltage drops to zero volts is the maximum current density X. This maximum current density x represents the power generation capacity of the solid electrolyte device. The maximum current density is determined by extrapolation of the measured discharge characteristic curve until the terminal voltage reaches zero volts as shown in FIG. 4.

Figure 5:
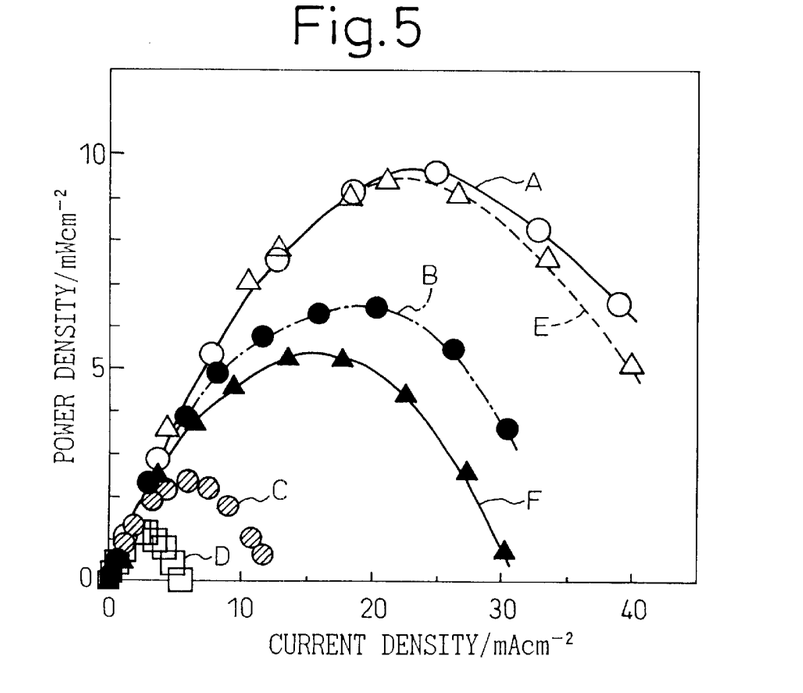
FIG. 5 is a graph showing the relation between a terminal power density of various solid electrolyte devices and a terminal current density.

Such discharge characteristic curves shown in FIG. 4 are determined for various solid electrolyte devices while the ambient temperature of the solid electrolyte devices is kept at 850° C. (1,123K), and terminal power density curves shown in FIG. 5 are obtained. The ordinate in FIG. 5 represents the power density (voltage ×current density) and the abscissa represents the current density.

The curves of the terminal power density shown in FIG. 5 are convex curves. The higher the point at which the terminal power density becomes maximal and the greater the area of the protruding curve, the greater becomes the power generation quantity.

Of the curves of the terminal power density shown in FIG. 5, the curves A and B are of the solid electrolyte device 16A shown in FIG. 1. The curve A represents the terminal power density of the solid electrolyte device 16A in which 5 mass %, on the basis of platinum, of metal oxide particles of $CoNiO_2$ is blended as the methane gas oxidation catalyst with the porous platinum layer forming the electrode 14a as the anode. The curve B represents the terminal power density of the solid electrolyte device 16A in which metal particles 20, 20 of CoO are blended in place of the metal oxide particles 20, 20 of $CoNiO_2$.

Furthermore, the curve F represents the terminal power density of the solid electrolyte device 16B shown in FIG. 2, the electrode 14b, as the anode, of which includes the porous metal layer 22a and the layer 22b in which the metal oxide particles consisting of $PdCoO_2$ are sintered as the methane gas oxidation catalyst on the surface of this porous platinum layer 22a.

FIG. 5 also shows the terminal power density of the solid electrolyte device 106 shown in FIG. 10 that has the electrode 104a as the anode comprising only porous platinum (curve D). The graph also shows the terminal power density of the Ni-YSZ cermet solid electrolyte device 110 shown in FIG. 11 (curve E), and the terminal power density of the solid electrolyte device 200 that has the porous platinum layer for forming the electrode 104c as the anode containing the metal oxide particles 202, 202 of $PdCoO_2$ used in the conventional solid electrolyte fuel cell shown in FIG. 10 (curve C).

Figure 6:
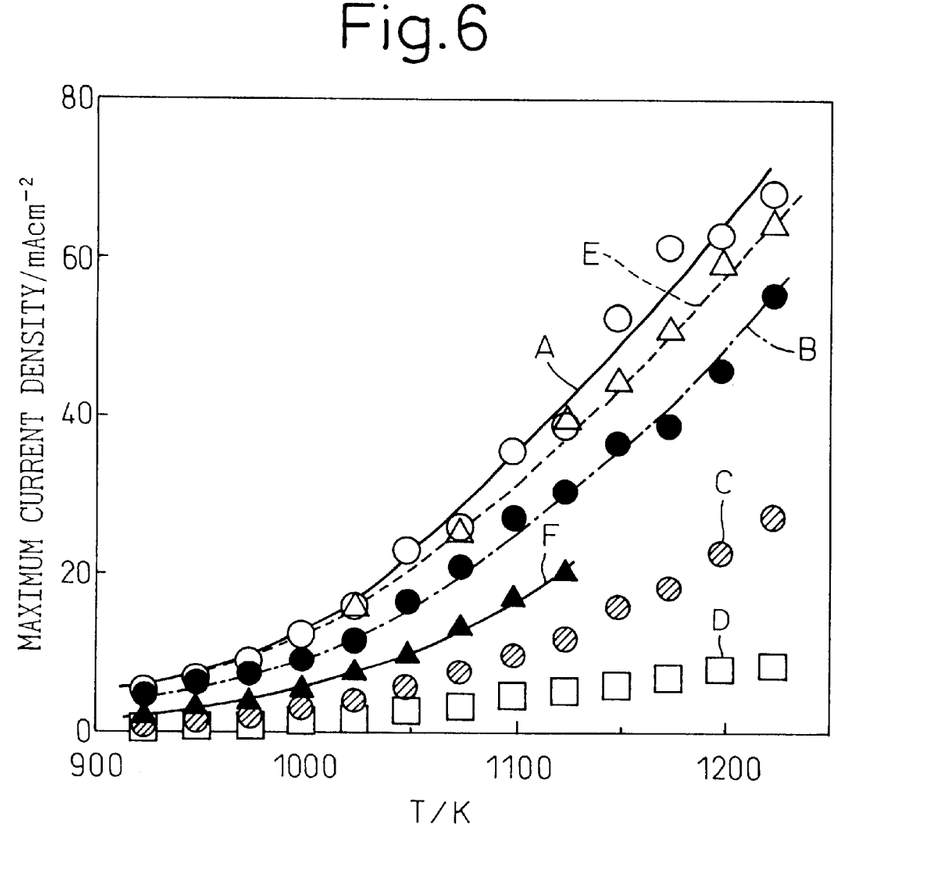
FIG. 6 is a graph showing the relation between the maximum current densities of various solid electrolyte devices and the temperature.

FIG. 6 shows the relation between the solid electrolyte device and the operating temperature. Each curve in FIG. 6 represents the relation between the maximum current density X, that is determined from the discharge characteristic curves for various solid electrolyte devices in the same way as in FIG. 4, and the temperature. The solid electrolyte devices corresponding to the curves A to E are the same as those of FIG. 5. As is obvious from FIG. 6, the maximum current density of each solid electrolyte device increases with a higher ambient temperature (operating temperature). In other words, the power generation capacity of the solid electrolyte device increases when the temperature becomes higher. The temperature of the abscissa of FIG. 6 represents the absolute temperature (K).

It can be seen clearly from FIGS. 5 and 6 that the solid electrolyte device 16A (curve A), that includes the electrode 16a formed by blending the metal oxide particles 20, 20 of $CoNiO_2$ with the porous platinum layer as the methane gas oxidation catalyst, exhibits a higher terminal power density and a higher maximum current density than the Ni-YSZ cermet solid electrolyte device 110 (curve E). The power generation quantity and power generation capacity of the solid electrolyte device 16A (curve A) are also superior to those of the Ni-YSZ cermet solid electrolyte device 110 (curve E).

Both solid electrolyte devices 16A and 16B used for the solid electrolyte fuel cells shown in FIGS. 1 and 2 exhibit a higher terminal power density and a higher maximum current density than the solid electrolyte devices 106 and 200 used in the conventional solid electrolyte fuel cells, and their power generation quantity and power generation capacity of the solid electrolyte devices 16A and 16B are also superior to those of the solid electrolyte devices 106 and 200.

The terminal power density and the maximum current density of the Ni-YSZ solid electrolyte device 110 shown in FIGS. 5 and 6 may seem superior to the terminal power density and the maximum current density of each of the solid electrolyte device 16A including the electrode 16a formed by blending CoO metal particles 20, 20 in the porous platinum layer as the methane gas oxidation catalyst (solid electrolyte device corresponding to the curve B), and the solid electrolyte device 16B including the electrode 14b comprising of the porous platinum layer 22a and a layer 22b, in which metal oxide particles of $PdCoO_2$ are dispersed and fixed as the methane gas oxidation catalyst on the surface of the porous platinum layer 22a (solid electrolyte device corresponding to the curve F).

Figure 7:
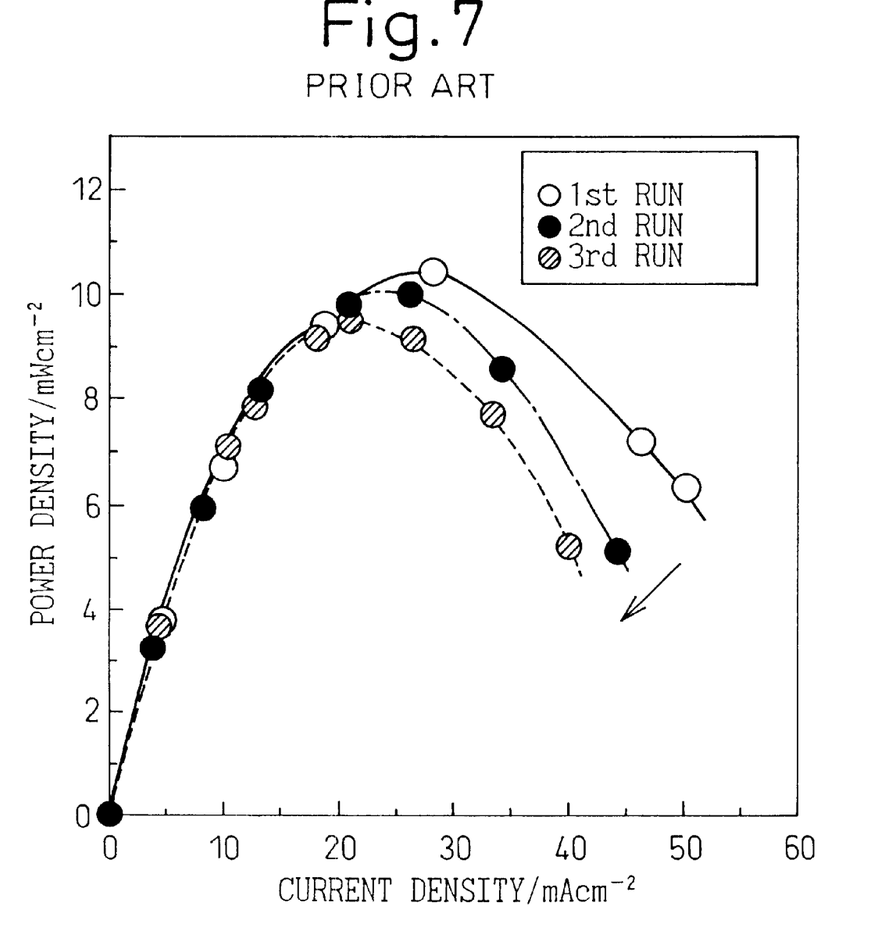
FIG. 7 is a graph showing the change of the terminal power density when the terminal power density of a conventional solid electrolyte device is measured repeatedly.

However, the terminal voltage and the terminal current at the electrodes 102 and 104b of the Ni-YSZ cermet solid electrolyte device 110 have the following properties. When the same measurement is carried out once again after the terminal voltage is measured by changing the terminal current, the voltage becomes lower even though the terminal current is the same. FIG. 7 shows the relation between the terminal power density and the current density in this instance. In FIG. 7, the term "1st run" represents the terminal power density curve measured by the first measurement. The term "2nd run" represents the terminal power density curve measured by the second measurement and the term "3rd run" represents the terminal power density curve measured by the third measurement. As is obvious from FIG. 7, performance of the Ni-YSZ cermet solid electrolyte device 110 gradually deteriorates in the direction of an arrow. Particularly when the terminal current is increased, the deterioration becomes large.

Figure 8:
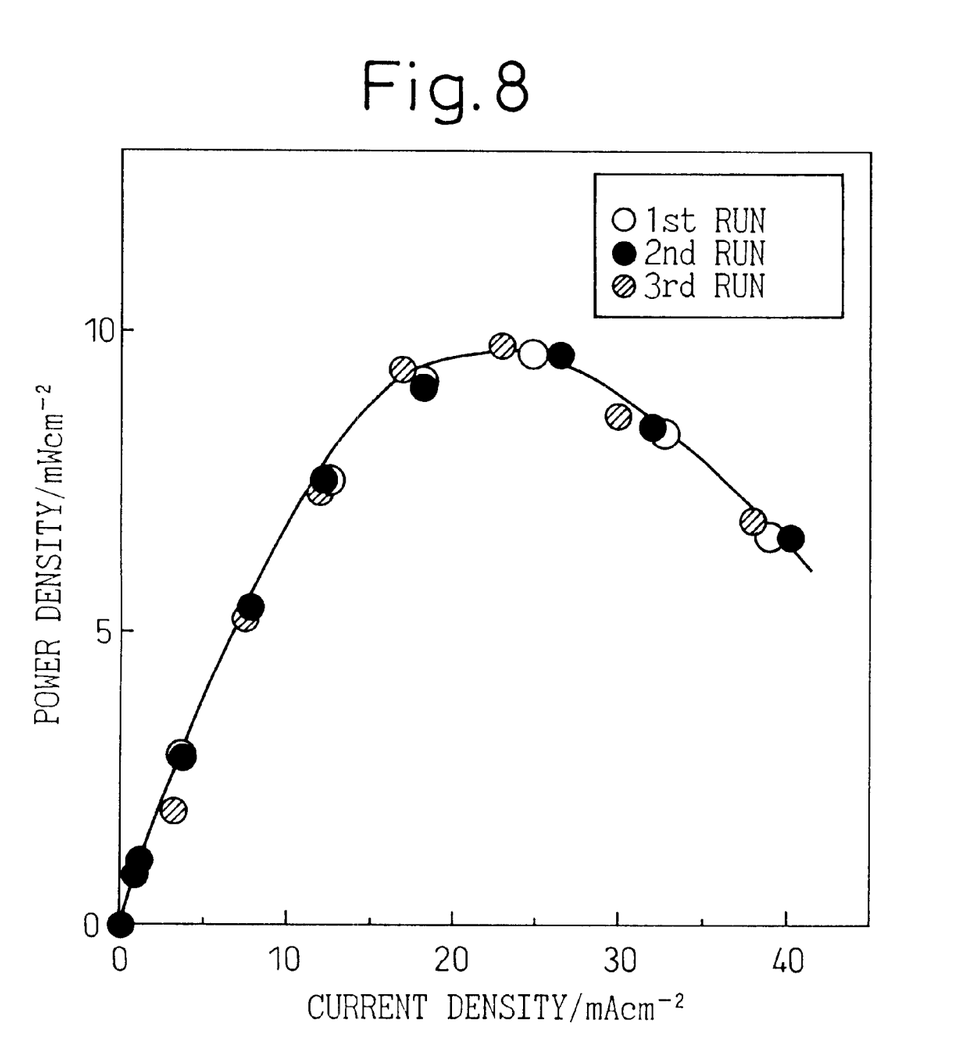
FIG. 8 is a graph showing the change of the terminal power density when the terminal power density of the solid electrolyte device according to the present invention is measured repeatedly.

In contrast, the solid electrolyte devices 16A and 16B used in the solid electrolyte fuel cells shown in FIGS. 1 and 2 do not exhibit deterioration of the terminal power density of the Ni-YSZ cermet solid electrolyte device 110 shown in FIG. 7. This will be explained with reference to FIG. 8. The graph shows the result when the terminal power density of the solid electrolyte device 16A, that includes the electrode 16a comprising the porous platinum layer blended with the metal oxide particles 20, 20 of $CoNiO_2$, is repeatedly measured three times in the same way as the measurement of the terminal power density shown in FIG. 6. As is obvious from FIG. 8, deterioration of performance of the solid electrolyte device 16A cannot be observed when the measurement repeated thrice.

Figure 9:
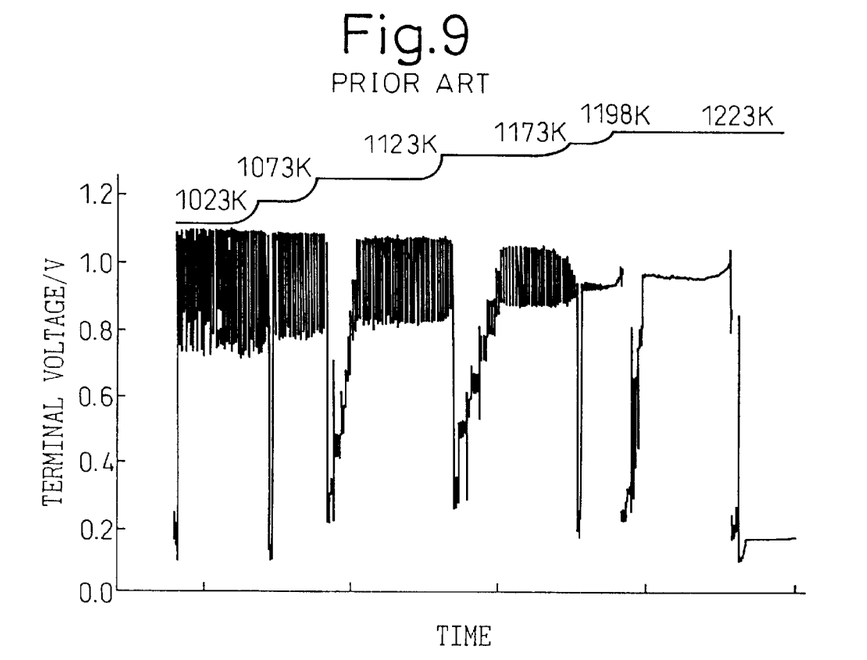
FIG. 9 is a chart useful for explaining the relation between an ambient temperature of a conventional solid electrolyte device and a terminal voltage.

The ambient temperature at which the terminal voltage of the Ni-YSZ cermet solid electrolyte device 110 becomes stable is at least 925° C. (1,198K) and preferably, at least 950° C. (1,223K), as shown in FIG. 9. The terminal voltage becomes unstable when the ambient temperature is less than 925° C. (1,198K). Incidentally, the supply of methane gas is suspended during the period in which the ambient temperature is changed in FIG. 9, and is started again after the ambient temperature reaches a desired temperature.

Deterioration of performance of the solid electrolyte device 110 becomes remarkable at a temperature higher than 925° C. (1,198K) at which the Ni-YSZ cermet solid electrolyte device 110 operates stably. This presumably results from the drop of reactivity of the electrodes due to sintering of the Ni particles contained in the solid electrolyte substrate 114, or due to adhesion of carbon to the electrode surface.

In this aspect, the solid electrolyte devices 16A and 16B used for the solid electrolyte fuel cells shown in FIGS. 1 and 2 can provide a stable terminal voltage at the ambient temperature falling within the range in which the terminal voltage of the Ni-YSZ cermet solid electrolyte device 110 becomes unstable. Performance of the solid electrolyte devices 16A and 16B remains stable at the ambient temperature higher than 925° C. (1,198K).

As explained above, the solid electrolyte fuel cells shown in FIGS. 1 and 2 can generate power more stably than the solid electrolyte fuel cell using the Ni-YSZ cermet solid electrolyte device 110.

However, the layer 22$b$ made of $PdCoO_2$ is more likely to undergo thermal decomposition when the ambient temperature exceeds 900° C. (1,173K), in the solid electrolyte device 16B shown in FIG. 2 equipped with the electrode 14$b$ comprising of the porous platinum layer 22$a$ and the layer 22$b$ including the metal oxide particles of $PdCoO_2$ sintered on the surface of the porous platinum layer 22$a$.

In this aspect, the solid electrolyte device 16A of FIG. 1 equipped with the electrode 14$a$ formed by blending the metal oxide particles of $CoNiO_2$ or CoO in the porous platinum layer has an excellent heat resistance without thermal decomposition even when the ambient temperature exceeds 900° C. (1,173K).

In such a solid electrolyte device 16A shown in FIG. 1, the solid electrolyte device 16A equipped with the electrode 14$a$, that is formed by blending $CoNiO_2$ as the metal oxide particles 20, 20, exhibits the best terminal power density and the best maximum current density as shown in FIGS. 5 and 6. In other words, this solid electrolyte device 16A exhibits the most excellent power generation quantity and power generation capacity.

The solid electrolyte device 16A equipped with the electrode 14$a$ formed by blending the metal oxide particles 20, 20 of $CoNiO_2$ in the porous platinum layer can be obtained in the following way. First, each of the powder of CoO and the powder of NiO is mixed and burned at 1,300° C. for about 24 hours in the open air and is thereafter pulverized, giving the metal oxide particles 20 comprising $CoNiO_2$. A predetermined amount of the metal oxide particles 20 are mixed with a platinum paste to give a mixed paste. After the mixed paste is applied to one of the surfaces of the YSZ burned body, sintering is carried out at 130° C. for about one hour in the open air to give the solid electrolyte device 16A.

Incidentally, the ambient temperature at which the solid electrolyte device 16A equipped with the electrode 14$a$ formed by blending the metal particles 20, 20 of $CoNiO_2$ in the porous platinum layer can exhibit its best performance, is 700 to 950° C. Such a temperature range is the one within which the terminal voltage of the Ni-YSZ cermet solid electrolyte device 110 becomes unstable. When the solid electrolyte device 16A capable of exhibiting high performance at a relatively low temperature is used, the condition of the heat resistance for the components constituting the solid electrolyte fuel cell can be mitigated. Consequently, the production cost of the solid electrolyte fuel cell can be reduced.

The solid electrolyte fuel cell according to the present invention has a broader temperature range in which it can exhibit its performance fully, and exhibits excellent power generation performance. Therefore, the present invention can generate power more efficiently by using the solid electrolyte fuel cell. The present invention can also reduce the production cost of the solid electrolyte fuel cell.

What is claimed is:

1. A solid electrolyte fuel cell which includes a solid electrolyte device having electrodes formed on both surfaces of an oxygen ion-conductive solid electrolyte substrate, and wherein oxygen or an oxygen-containing gas is supplied to said electrode on the cathode side and methane gas, as fuel, is supplied to said electrode on the anode side of said solid electrolyte device, characterized in that:

metal oxide particles consisting of $CoNiO_2$ or CoO are blended as an oxidation catalyst for methane gas in a porous platinum layer forming substantially said electrode on the anode side of said solid electrolyte device.

2. A solid electrolyte fuel cell which includes a solid electrolyte device having electrodes formed on both surfaces of an oxygen ion-conductive solid electrolyte substrate, and wherein oxygen or an oxygen-containing gas is supplied to said electrode on the cathode side and methane gas, as fuel, is supplied to said electrode on the anode side of said solid electrolyte device, characterized in that:

an oxide layer in which metal oxide particles consisting of $PdCoO_2$ are sintered as an oxidation catalyst for methane gas is formed on the surface of a porous platinum layer forming said electrode on the anode side of said solid electrolyte device.

3. A solid electrolyte fuel cell according to claim 1, wherein said solid electrolyte substrate is formed of a stabilized zirconia burned body containing yttria, and said electrode on the cathode side is formed of lanthanum strontium manganese oxide $[(La_{0.85}Sr_{0.15})_{0.90}MnO_3]$.

4. A solid electrolyte fuel cell according to claim 2, wherein said solid electrolyte substrate is formed of a stabilized zirconia burned body containing yttria, and said electrode on the cathode side is formed of lanthanum strontium manganese oxide $[(La_{0.85}Sr_{0.15})_{0.90}MnO_3]$.

* * * * *